Patented Feb. 3, 1953

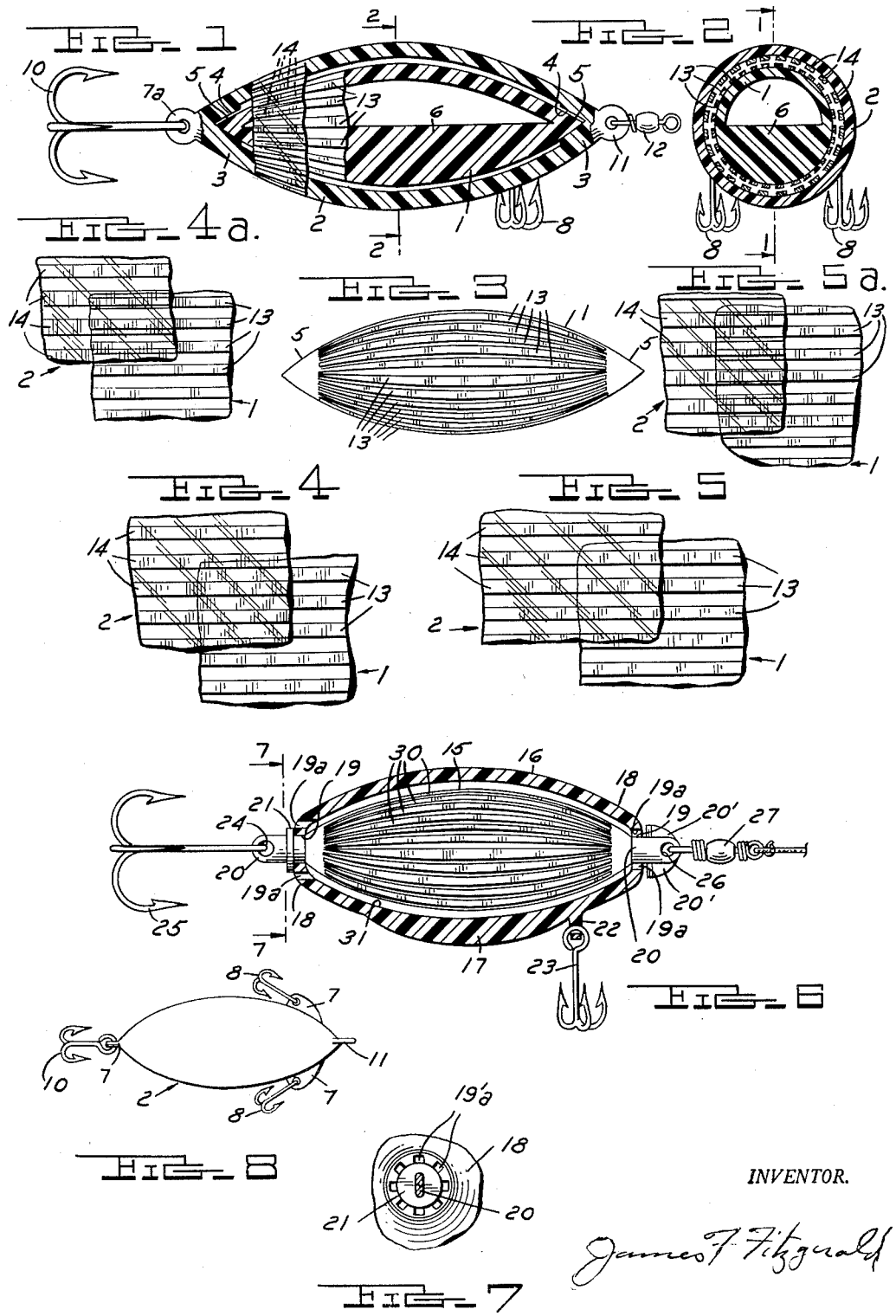

2,627,134

UNITED STATES PATENT OFFICE 2,627,134

FISH LURE

James F. Fitzgerald, New York, N. Y.

Application June 25, 1951, Serial No. 233,288

2 Claims. (Cl. 43—42.06)

The present invention relates to a fish lure which is of a construction and arrangement to produce in use novel and attention-directing patterns of light and shade in a dazzling, shimmering effect designed to have an unusual attention-directing effect.

Objects and advantages of the invention will be set forth in part hereinafter and in part will be obvious herefrom, or may be learned by practice with the invention, the same being realized and attained by means of the compositions, combinations, improvements and instrumentalities pointed out in the appended claims.

The invention consists in the novel parts, constructions, arrangements, combinations and improvements herein shown and described.

The accompanying drawings, referred to herein and constituting a part hereof, illustrate various embodiments of the invention, and together with the description, serve to explain the principles of the invention.

An object of this invention is to provide a fish lure having the characteristics aforesaid which is also light in weight, simple in construction and lends itself readily to manufacture from cheap and readily available glass, plastic and like light weight materials.

A still further object of my invention is to provide a fish lure in which certain of the hooks are attached to the lure by novel means functioning as vanes for effecting slow rotation of the lure to produce the shimmering effect characterizing my lure.

In general and in accordance with my invention, I provide an elongated partly hollow inner body and an elongated hollow outer body, both mounted on a common axis for relative oscillation or rotation, which need be only slight to obtain the shimmering effect desired. In accordance with my invention both embodiments will sink in the water as the material is sinkable, also the air space and weighted inner body will control the weight of the lure so that it will sink, but will not be too heavy for the purpose. In accordance with my preferred embodiment the outer body is watertight and sinkable as the air space in outer and inner bodies is not enough to make the lure float.

The outer bodies of both embodiments are to be made in two parts, so that the lure can be assembled. The two parts, of the outer bodies, are then to be joined together with cement.

Each of the bodies is preferably of a streamline contour axially, and is advantageously an elliptical or other equivalent surface of revolution coaxial with said common rotational axis. It is also a feature of advantage in accordance with my invention that the inner body is journalled at its opposite ends for rotation relative to the outer body in bearings forming a part of the outer body, thus dispensing with the requirement of a fixed shaft for this purpose.

In accordance with my invention also, each body is preferably of a transparent or translucent material, preferably a light weight plastic or glass moulded or otherwise suitably formed into the desired shape. Each body is of a construction to present to the eye of the observer a lined or striped surface forming a grating of alternate lines and spaces running generally longitudinally of the body, in which grating the lines and spaces are of equal width. Preferably, the lines are opaque and the spaces are clear or translucent, but it is within the contemplation of my invention to provide a grating in which the lines are colored and translucent but of a lesser degree of translucency than the spaces. In such case the shimmering effect obtainable in the use of my invention, as will be more fully described hereinafter, will be enhanced to a marked degree by the varying color effects so created. The spaces may be of the same color, and the same degree of transparency as the plastic or glass it is made of.

Advantageously, the grating of lines and spaces on one body may possess the same number of divisions per unit of measurement as does the grating on the other body, it being understood that a division is represented by a single stripe or a single space. In such case, when one body is slightly moved on its rotational axis to bring the lines of one successively into and out of register with the spaces of the other, a "shutter" effect will be produced as the passage of light is successively interrupted. Preferably, however, I employ either a greater or a lesser number of divisions per unit of measurement on the one body than on the other so as to obtain a "vernier" effect by the relative movement of the inner and outer bodies. For the optimum vernier effect I prefer that one body have either one full division, or fraction of a division, more or less per unit of measurement than the other body. Illustratively, and in accordance with such preferred form of grating, one grating may have, for example, 15 divisions per inch and the other 16 or 15½, or 14 or 14½, it being understood that the greater the number of divisions per unit of measurement in a grating, the more pronounced will be the shifting patterns of light and shade resulting from the relative movement of the bodies on their common axis.

In accordance with my invention also one of the bodies is preferably suitably weighted so as to be statically unbalanced on its rotational axis and to tend to maintain a fixed position in use. The other body is preferably equipped with suitable vane means disposed and arranged to cause this body in use to undergo slow rotation on its axis by the action of the water moving by the lure. It will be understood that the rate of relative angular displacement of the inner and outer bodies should be slow so as not to cause blurring of the light patterns created by the relative movement of the bodies. Thus, in some cases at least it may be possible to dispense with the vane means since only a slight rotation of one body relative to the other is necessary to obtain the desired effect.

In the drawings:

Fig. 1 is a central longitudinal sectional view with portions of the inner and the outer bodies shown in side elevation to illustrate the striping thereon.

Fig. 2 is a transverse section on the line 2—2 of Fig. 1.

Fig. 3 is a detail side elevation of the inner body of the embodiment shown in Fig. 1.

Figs. 4, 5, 4a and 5a are enlarged fragmentary planar views of the portions of the walls of the inner and the outer bodies of the lure shown in Fig. 1, illustrating various relative positions of the stripes thereon and with the stripes and spaces equal per unit of measurement in both bodies and with the stripes and spaces differing on the two bodies.

Fig. 6 is a view similar to Fig. 1 of a modified form of the invention.

Fig. 7 is a partial end view of the embodiment of Fig. 6.

Fig. 8 is a view in top plan on a somewhat reduced scale of a lure substantially in accordance with the embodiment shown in Fig. 1, showing the novel and preferred manner of attaching the side hooks to the rotation-imparting vanes of my invention.

In accordance with the embodiment illustrated in Figs. 1–4, 1 represents an inner hollow striped body suitably composed of transparent or translucent plastic, glass, or other suitable material, the body being of a generally streamlined contour. Rotatably supported on said inner body in closed spaced relation thereto is an outer body 2 of like material and substantially matching contour, the inner body being journalled in the outer body for rotation or oscillation relative to said outer body. To this end, the inner ends of the outer body 2 comprise thickened bearing portions 3 having generally conical coaxial bearing wells 4 in which the respective outer ends 5 of the inner body 1 are journalled for relative rotation or oscillation of said bodies on the common rotational axis.

The inner body 1 is statically unbalanced on the rotational axis as through the provision of a thickened portion 6 which is on its inner surface and serves to minimize any rotational movements of said inner body induced by the water flowing past the lure when in use. It is obvious that the inner body may have a weighted member in lieu of the thickened portion 6 to provide the necessary unbalancing mass for accomplishing the desired stabilizing action. It is also preferable to provide the outer surface of the outer body at its head end with eyelets 7 in the form of fins suitably disposed and arranged, as shown best in Fig. 8, to impart a rotational movement to the outer body as the water passes by and to provide a means of attachment for suitable fish hooks 8 which may be single, double, or triple barbed units as desired.

The outer body 2 is provided at its tail end also with an eyelet 7a to which the trailing fish hook 10 may be attached. The front end of the outer body is also provided with an eyelet 11 to which a fishline is adapted to be attached through the medium of a swivel 12.

The surface of the inner body 1 is circumferentially divided to provide a grating of preferably closely spaced longitudinally extending stripes 13 inscribed or otherwise suitably formed on or in the surface, preferably the outer surface as appears in Fig. 2. The stripes 13 on the body 1 are of equal width and are spaced from each other the width of the individual stripes.

The surface of the outer body 2 is likewise divided circumferentially to provide a grating of stripes 14 thereon, preferably on the inner surface as appears in Fig. 2. The stripes 14 are also of equal width and are also spaced from each other the width of the individual stripes, but the number of divisions into which the surface of the outer body is divided per unit of length is, in the preferred embodiment of Fig. 1, less for the outer body than for the inner body, as is also shown in Fig. 4a. By the same token, Fig. 5a is illustrative of the change in the pattern resulting from a shift in the relative position of the two bodies by one stripe.

I have found that the vernier effect obtained is accentuated as the number of divisions per unit of measurement is increased. I prefer that the number of divisions be in the range of 10 to 20 per inch for one grating, with the other having one division or a fraction of a division more or less, per unit of length, than the first. Thus, I have illustrated in Fig. 4a the vernier effect probably obtainable when the bodies 1 and 2 are provided with gratings of 15 and 14 divisions per inch, respectively. Likewise, Fig. 5a is illustrative of the probable change in the light pattern resulting from a shift in one division of position of the bodies 1 and 2. It will be understood that the patterns shown in Figs. 4a and 5a, and in Figs. 4 and 5, are instantaneous patterns but that these patterns would be constantly shifting and become fugitive patterns as the inner and outer bodies rotate relative to each other.

The stripes 12 and 13 in the respective gratings may be of any suitable color and may be semi-transparent or opaque. The stripes may be printed or painted on the inner and outer bodies or may be applied in any other suitable manner as, for example, by having the stripes in the form of plastic strips which are attached to the respective bodies. By disposing the stripes on the inner surface of the outer body and the outer surface of the inner body I obtain a definite advantage for two reasons. First, the stripes on the respective bodies are as close together as possible so that a better interference pattern will be obtained. Secondly, the stripes on the outer body are protected from abrasion and wear by action of the water or by contact with other surfaces.

In operation, the fish lure once in the water will sink. As the lure is drawn through the water, the action of the water striking the outer body and fins 7 will cause the outer body slowly to rotate or rock with respect to the inner body. The inner body will tend to remain substantially stationary in regard to any rotational movement due to its weighted portion. If the inner body should happen to rotate slightly due to external forces, it will tend immediately to return to its original position. As the outer body slowly rotates or rocks back and forth, the stripes of the outer body move past the stripes on the inner body thus producing an interference pattern which appears to flow generally circumferentially of the respective bodies at right angles to the stripes.

It is obvious that the shape of the lure may be varied.

Fig. 6 represents an embodiment of my invention in which the stripped inner body 15 is adapted to rotate slightly or rock with respect to the normally stationary outer body 16, said outer body preferably having a thickened portion 17 on its under surface to act as a position stabilizing weight minimizing rotation. The ends 18 of the outer body are provided with coaxial holes 19 through which coaxial shaft members 20 of the inner body extend. The holes 19 are of sufficient dimension so that the inner body is journalled therein by the shaft members 20 adapted to rotate with respect to the outer body under the action of the water moving past the lure. Advantageously, the front shaft member 20 may be provided with a suitably pitched fin or vane 20' or a plurality of the same for imparting rotation or rocking motion to the inner body if necessary. It is preferable to provide the rear shaft member 20 on the front end with a thrust washer 21 as shown so that the latter will receive the greater part of the thrust force exerted by the inner body as it rotates, or rocks slightly.

The outer body 16 is provided with an eyelet 22 at its under surface by which a fish hook 23 may be attached. Likewise, the rear shaft member 20 has a hole 24 by which a fish hook 25 may be attached, while the front shaft member 20 has a hole 26 by which the lure may be attached to a fish line through a swivel 27. The inner body 15 is solid, or hollow and watertight. The water first entering the outside body by flowing through the holes 19a. It is preferable to locate the stripes 30 on the inner body 15 on its outer surface and the stripes 31 of the outer body 16 on its inner surface so as to have the stripes on one body close to the stripes on the other body and thus obtain the advantage previously discussed in describing the embodiment of Figs. 1-4.

In operation, the lure when placed in water sinks since the water flows through the openings 19 until the outer body 16 becomes filled. As the lure is drawn through the water, the latter acts on the outside surface of the inner body and fin 20' thus causing it to rotate slowly or rock slightly with respect to the inner body. The rotation or oscillation of the outer body is negligible due to its weighted outside surface and if it rotates at all it is immediately returned to its original position. As in the embodiment illustrated in Figs. 1-4, the bodies are striped so as to give an interference or a shutter pattern.

The invention in its broader aspects is not limited to the specific compositions, combinations and improvements described but departures may be made therefrom within the scope of the accompanying claims without departing from the principles of the invention and without sacrificing its chief advantages.

I claim:

1. A streamlined transparent fish lure comprising an elongated, hollow body statically unbalanced, said body being provided at its opposite ends with openings forming journal bearings and ports in said bearings for the admission of water to and from the interior of the body, a second body within said hollow body provided at its opposite ends with longitudinally projecting shaft members disposed within the corresponding bearings in said hollow body, said bodies being relatively rotatable about a common longitudinal axis, means on one of said bodies acting to impart rotary movement thereto as said lure is drawn through the water, and means at the ends of said second body for connecting a fish line and a hook thereto.

2. A fish lure as defined in claim 1 in which each of the bodies is formed of transparent material on which are provided a plurality of spaced substantially opaque stripes extending substantially longitudinally of the body, the intervening spaces being substantially transparent.

JAMES F. FITZGERALD.

REFERENCES CITED

The following references are of record in the file of this patent:

UNITED STATES PATENTS

| Number | Name | Date |
| --- | --- | --- |
| 741,730 | Smith | Oct. 20, 1903 |
| 839,917 | Chapman | Jan. 1, 1907 |
| 2,198,043 | Scogland et al. | Apr. 23, 1940 |
| 2,326,397 | Schwartz | Aug. 10, 1943 |
| 2,374,371 | Morch | Apr. 24, 1945 |
| 2,517,620 | Anderson | Aug. 8, 1950 |
| 2,560,733 | Morris | July 17, 1951 |